United States Patent

Heston et al.

Patent Number: 5,342,126
Date of Patent: Aug. 30, 1994

[54] TWIST LOCK ATTACHMENT FOR A THERMAL PROBE

[75] Inventors: Jeffrey W. Heston, Warren; Marc D. Polanka, Solon, both of Ohio; Jeffrey A. Rock, West Henrietta; Scott A. Geiger, Rochester, both of N.Y.

[73] Assignee: General Motors Corporation, Detroit, Mich.

[21] Appl. No.: 151,638

[22] Filed: Nov. 15, 1993

Related U.S. Application Data

[63] Continuation of Ser. No. 87,564, Jul. 9, 1993, abandoned.

[51] Int. Cl.⁵ .................... G01K 1/14; G01K 13/02
[52] U.S. Cl. ........................ 374/208; 374/135; 411/349; 24/590; 403/349
[58] Field of Search ............... 374/208, 135; 411/349, 411/549, 552, 555; 24/590, 453; 403/348, 349

[56] References Cited

U.S. PATENT DOCUMENTS

| | | | |
|---|---|---|---|
| Re. 34,381 | 9/1993 | Barnes | 24/590 |
| 4,096,754 | 6/1978 | Beveridge, Jr. et al. | 374/208 |
| 4,378,913 | 4/1983 | Fohl | 411/349 |
| 4,622,851 | 11/1986 | Wilson | 374/208 |
| 4,641,012 | 2/1987 | Roberts | 374/208 |
| 4,758,688 | 7/1988 | Aschberger | 374/208 |
| 4,830,515 | 5/1989 | Cortes | 374/208 |
| 5,044,771 | 9/1991 | Masom | 374/208 |
| 5,123,795 | 6/1992 | Engel et al. | 411/552 |
| 5,139,345 | 8/1992 | Schafer et al. | 374/208 |

FOREIGN PATENT DOCUMENTS

| | | | |
|---|---|---|---|
| 0848832 | 7/1981 | U.S.S.R. | 403/349 |
| 0865017 | 4/1961 | United Kingdom | 374/135 |

*Primary Examiner*—Diego F. F. Gutiemerrez
*Attorney, Agent, or Firm*—Saul Schwartz

[57] ABSTRACT

A twist lock for attaching a plastic shell of a thermal probe to a structural member such as a plastic intake manifold of an internal combustion engine in a socket in the structural member. The twist lock includes hooks on the plastic shell which traverse an annular shoulder at the bottom of the socket through notches in the shoulder when the shell is inserted in the socket and which are captured by the shoulder when the shell is rotated in the socket from an unlocked position to a locked position. The twist lock further includes a lug on the shell cooperating with a cam edge on a resilient lip around an open end of the socket to afford tactile representation of the progress of the shell toward and achievement of the locked position and to prevent reverse rotation of the shell from the locked position.

5 Claims, 2 Drawing Sheets

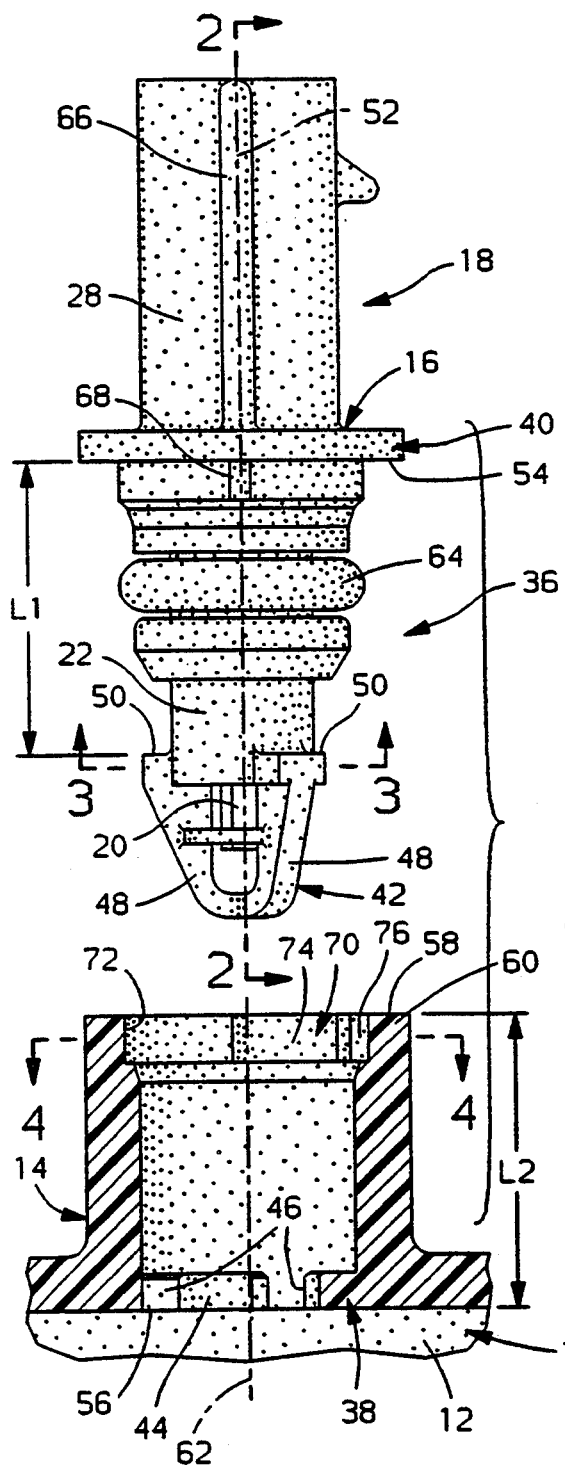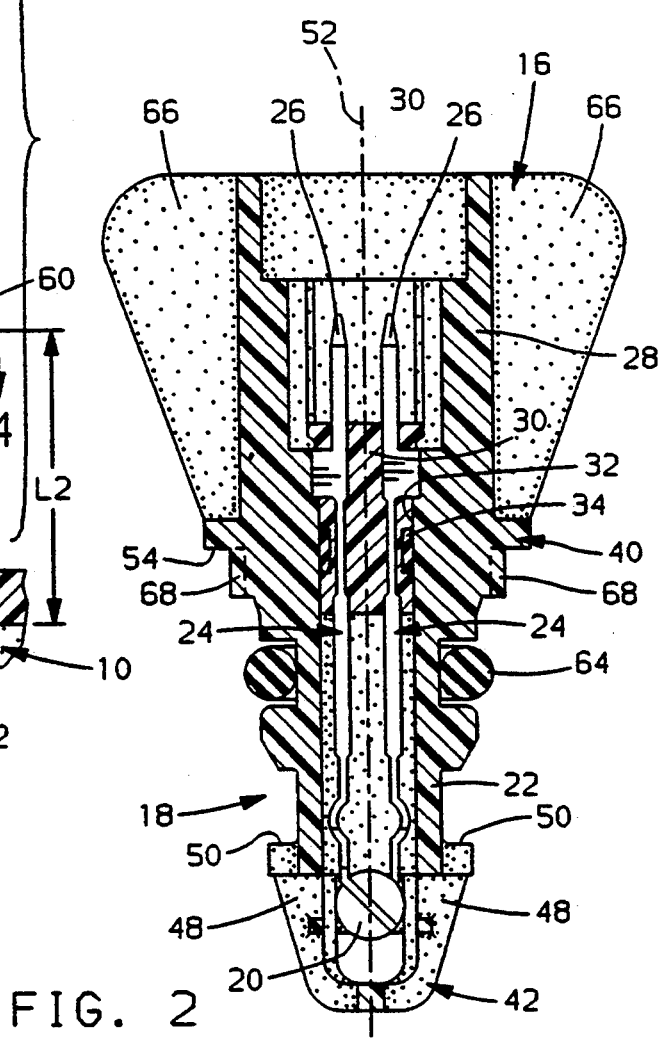
FIG. 1
FIG. 2

TWIST LOCK ATTACHMENT FOR A THERMAL PROBE

This is a continuation of application Ser. No. 08/087,564, filed on 09 Jul. 1993, now abandoned.

FIELD OF THE INVENTION

This invention relates to apparatus for attaching a plastic shell of a thermal probe to a plastic structural member.

BACKGROUND OF THE INVENTION

U.S. Pat. No. 5,046,857, issued 10 Sept. 1991 and assigned to the assignee of this invention, describes a thermal probe assembly having a premolded unitary one piece plastic shell which attaches to a structural member, e.g. a plastic intake manifold of an internal combustion engine, through male screw threads on the shell and female screw threads in a socket on the manifold. Manufacturing costs associated with fabricating male and female plastic screw threads are relatively high. A twist lock according to this invention for attaching a plastic shell of a thermal probe to a plastic structural member such as an internal combustion engine intake manifold is an improvement relative to the thermal probe attachment described in the aforesaid U.S. Pat. No. 5,046,857.

SUMMARY OF THE INVENTION

This invention is a new and improved twist lock for attaching a plastic shell of a thermal probe to a plastic structural member such as an internal combustion engine intake manifold. The twist lock according to this invention includes axial retention features on a cylindrical socket in the structural member and on the shell which cooperate when the shell is rotated in the socket from an unlocked position to a locked position to prevent dislodgement of the shell from the socket, and circumferential retention features on the socket and on the shell which cooperate to prevent reverse rotation of the shell from the locked position. The axial retention features include an annular shoulder at the bottom of the socket and a plurality of hooks on the shell which traverse the plane of the shoulder through notches therein when the shell is inserted in the socket and which are captured by the shoulder when the shell is rotated to the locked position. The circumferential retention features include a pair of radial lugs on the plastic shell and an annular lip around an open end of the socket having cam edges therein. When the shell is manually rotated toward the locked position, force reactions between the lugs and ramps of the cam edges effect progressively increasing resilient deflection of the lip and correspondingly increasing resistance to rotation of the shell so that an installer experiences tactile indication of the progress of the installation. The ramps are contiguous with seats of the cam edges which capture the lugs in the locked position of the shell. Sharp discontinuities of the cam edges between the ramps and seats afford tactile and audible indication of achievement of the locked position.

BRIEF DESCRIPTION OF THE DRAWINGS

FIG. 1 is a partially broken-away elevational view of a thermal probe including a plastic shell having a twist lock according to this invention and showing the thermal probe prior to installation on a plastic structural member.

FIG. 2 is a sectional view taken generally along the plane indicated by lines 2—2 in FIG. 1;

DESCRIPTION OF A PREFERRED EMBODIMENT

Figure 3:
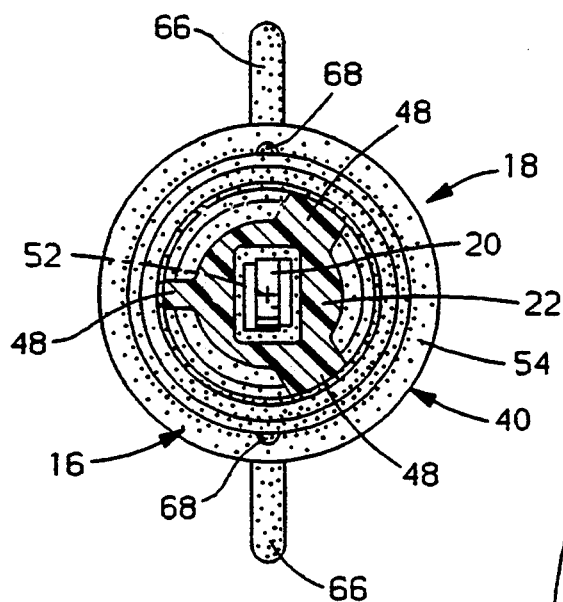
FIG. 3 is a sectional view taken generally along the plane indicated by lines 3—3 in FIG. 1.

Referring to FIGS. 1-3, a fragmentarily illustrated plastic structural member in the form of a plastic intake manifold 10 of an internal combustion engine, not shown, includes an internal chamber or induction passage 12 and a cylindrical socket 14. A one-piece, molded plastic shell 16 of a thermal probe 18 for monitoring the temperature of air in the induction passage 12 is disposed in the socket 14.

A thermistor 20 of the probe is supported below a tubular portion 22 of the shell 16 by a pair of elongated metal terminals 24 each having a pin end 26 in a receptacle portion 28 of the shell. A plastic premold 30 around the terminals is pressed into an appropriately configured passage 32 in the shell with a gas sealing elastomeric ring 34 therebetween whereby the terminals and the thermistor are attached to the shell. For a more complete description of the thermal probe 18, reference may be made to the aforesaid U.S. Pat. No. 5,046,857. The shell 16 is attached to the manifold 10 by a twist lock 36 according to this invention.

The twist lock 36 has axial retention features for preventing dislodgement of the shell 16 from the socket 14 including an annular shoulder 38 at the bottom of the socket 14, an annular flange 40 around the shell 16 between the tubular portion 22 and the receptacle portion 28, and a cage 42 at the distal end of the tubular portion 22. The annular shoulder 38 has an inside diameter 44 corresponding generally to the diameter of the tubular portion 22 and is pierced by an asymmetric array of notches 46 each open through the inside diameter 44.

The cage 42 surrounds the thermistor 20 and includes a plurality of radial legs 48 integral with the tubular portion 22 and defining an asymmetric array thereof, FIG. 3, corresponding in size and angular interval to the asymmetric array of notches 46 in the shoulder 38. Each of the legs 48 terminates at a flat hook 50 in a common plane perpendicular to a centerline 52 of the shell FIG. 1. The flat hooks 50 are separated from an annular surface 54 of the flange 40 in a plane perpendicular to the centerline 52 by a length dimension L1 of the shell, FIG. 1. The length dimension L1 of the shell corresponds to a length dimension L2, FIG. 1, of the socket 14 between an annular surface 56 of the shoulder 38 and an annular surface 58 defining the top of a reduced section annular lip 60 at the open end of the socket.

The shell 16 is inserted into the socket 14 with the tubular portion 22 first and has an unlocked position in the socket characterized by seating engagement of the surface 54 of the flange 40 against the surface 58 of the lip 60 and coincidence between the centerline 52 of the shell and a centerline 62 of the socket. Relative to the socket, the unlocked position of the shell is unique because the legs 48 can only traverse the plane of the shoulder 38 through the notches 46 when the asymmetric arrays of legs and notches are in angular registry. In the unlocked position of the shell, the hooks 50 on the legs 48 are closely adjacent but slightly below the plane of the annular surface 56 of the shoulder 38. An elastomeric seal ring 64 in a groove in the shell 16 seats against the cylindrical wall of the socket 14 to define a gas-tight seal between the shell and the socket.

Figure 5:
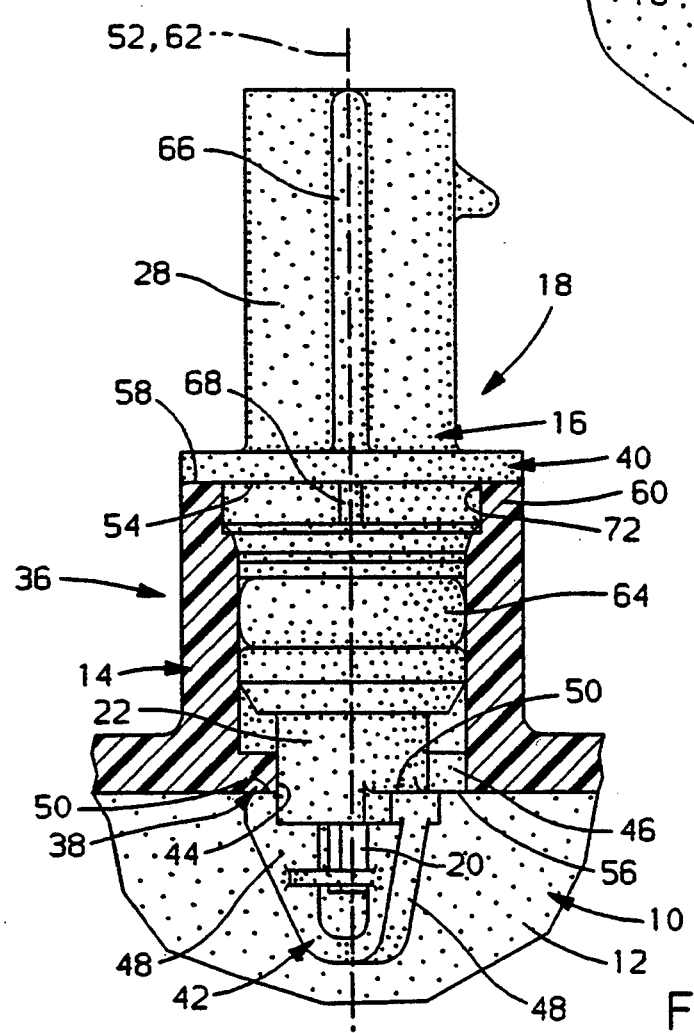
FIG. 5 is similar to FIG. 1 but showing the thermal probe after installation on the structural member.

The shell 16 has a locked position, FIG. 5, achieved by rotating or twisting the shell relative to the socket about the coincident centerlines 52,62 through an included angle of 60 degrees from the unlocked position. A pair of finger tabs 66, FIGS. 1–3, on the shell afford convenient manual grip for twisting the shell from the unlocked to the locked position. In the locked position of the shell, the asymmetric arrays of legs 48 and notches 46 are out of angular registry so that the surface 56 on the shoulder 38 captures the hooks 50 on the legs 48 to prevent dislodgement of the shell from the socket.

Figure 4:
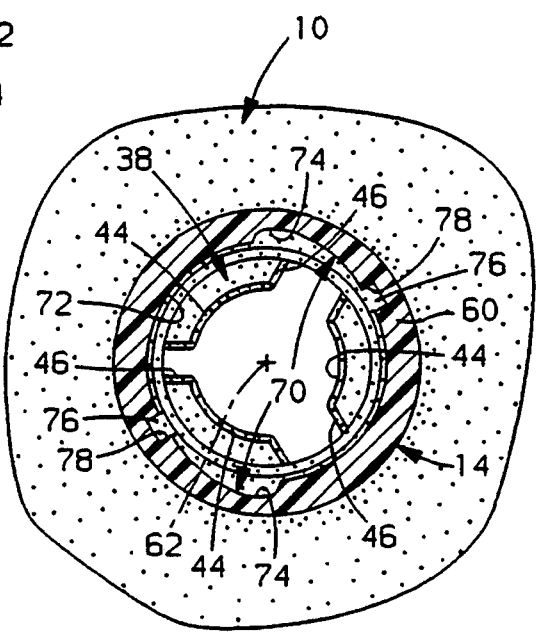
FIG. 4 is a sectional view taken generally along the plane indicated by lines 4—4 in FIG. 1.

The twist lock 36 also has circumferential retention features for preventing reverse rotation of the shell 16 from the locked position thereof including a pair of radial lugs 68 integral with and located on opposite sides of the shell adjacent the annular flange 40 and a pair of cam edges 70 located diametrically opposite each other on an inside cylindrical wall 72 of the lip 60, FIG. 4. The cam edges 70 each include a ramp 74 and a seat 76 contiguous with the ramp. Each ramp has an outboard end radially outboard of the inside cylindrical wall 72 and an inboard end closer to the inside cylindrical wall. The junction of the inboard end of each ramp and the corresponding seat 76 is characterized by a sharp discontinuity or step 78, FIG. 4. The radial depth of the seats 76 corresponds generally to the radial depth of the outboard ends of the ramps.

The cam edges 70 are located relative to the notches 46 and the legs 48 such that in the aforesaid unlocked position of the shell 16, the lugs 68 are disposed at respective ones of the outboard ends of the ramps, and in the aforesaid locked position, the lugs are disposed in respective ones of the seats 76. When the shell is rotated about the coincident centerlines 52,62 from the unlocked position toward the locked position by application of manual effort at the finger tabs 66, the lugs 68 engage the ramps 74. The force reactions between the lugs and the ramps include radial forces on the inside cylindrical wall 72 effecting resilient outward deflection of the lip 60 and tangential forces on the lugs resisting rotation of the shell toward the locked position.

The radial and tangential force reactions increase as the lugs approach the seats 76 due to the increasing interference between the ramps 74 and the lugs 68 and afford an installer tactile indication of the progress of the installation of the thermal probe. At the instant the lugs traverse the discontinuities 78 between the ramps and the seats, the aforesaid radial and tangential force reactions are relieved and afforded both tactile and audible indications of achievement of the locked position. In addition, the discontinuities 78 block the lugs 68 in the opposite direction to prevent reverse rotation of the shell from the locked position toward the unlocked position except upon application of a high level of manual effort at the finger tabs 66 indicative of or corresponding to a conscious intent to remove the thermal probe from the socket.

The embodiments of the invention in which an exclusive property or privilege is claimed are defined as follows:

1. In combination with
    a structural member having a fluid medium chamber and a cylindrical socket, and
    a thermal probe having a plastic shell adapted for disposition in said socket to monitor the temperature of a fluid medium in said fluid medium chamber,
    a twist lock comprising:
    means on said structural member defining an annular shoulder between said fluid medium chamber and said socket having an inside diameter and a circumferential array of a plurality of notches open through said inside diameter,
    means defining on said shell a plurality of radial legs each having thereon a hook and arranged in an angular array around said shell corresponding to said circumferential array of notches in said annular shoulder so that an unlocked position of said shell relative to said socket is defined by angular registry between said circumferential array of notches and said angular array of radial legs,
    means on said socket and on said shell operative to limit penetration of said shell into said socket such that in said unlocked position of said shell said hooks are disposed in said fluid medium chamber closely adjacent the plane of a planar surface of said annular shoulder so that when said shell is manually rotated in said socket from said unlocked position to a locked position said planar surface captures said hooks and prevents dislodgement of said shell from said socket, and
    cam and lug means on said shell and on said socket affording tactile representation of the progress of said shell toward said locked position and of achievement of said locked position during manual rotation of said socket from said unlocked to said locked position and retaining said shell in said locked position.

2. The combination recited in claim 1 wherein said cam and lug means includes:
    means defining a lug on one of said shell and said socket, and
    means defining a cam edge on the other of said shell and said socket including a ramp engageable on said lug during rotation of said shell from said unlocked to said locked position and increasingly resisting rotation of said shell toward said locked position and a seat contiguous with said ramp confining said lug in said locked position of said shell and preventing reverse rotation of said shell from said locked position toward said unlocked position.

3. The combination recited in claim 2 wherein said cam and lug means includes:
    means on the other of said shell and said socket defining a sharp discontinuity in said cam edge between said ramp and said seat effecting tactile representation of achievement of said locked position of said shell when said lug traverses said sharp discontinuity.

4. The combination recited in claim 3 wherein said cam and lug means includes:
    means defining a radially resilient lip around an open end of said socket including an inside cylindrical wall, and
    said cam edge is defined on said inside cylindrical wall.

5. The combination recited in claim 4 wherein:
    said circumferential array of notches in said annular shoulder is asymmetric, and
    said angular array of radial legs on said shell is correspondingly asymmetric so that said unlocked position of said shell relative to said socket is unique.

* * * * *